Sept. 12, 1933.  R. C. THOMPSON ET AL  1,926,660
APPARATUS FOR MEASURING ELECTRICAL IMPULSE FREQUENCY
Filed April 1, 1931  2 Sheets-Sheet 1
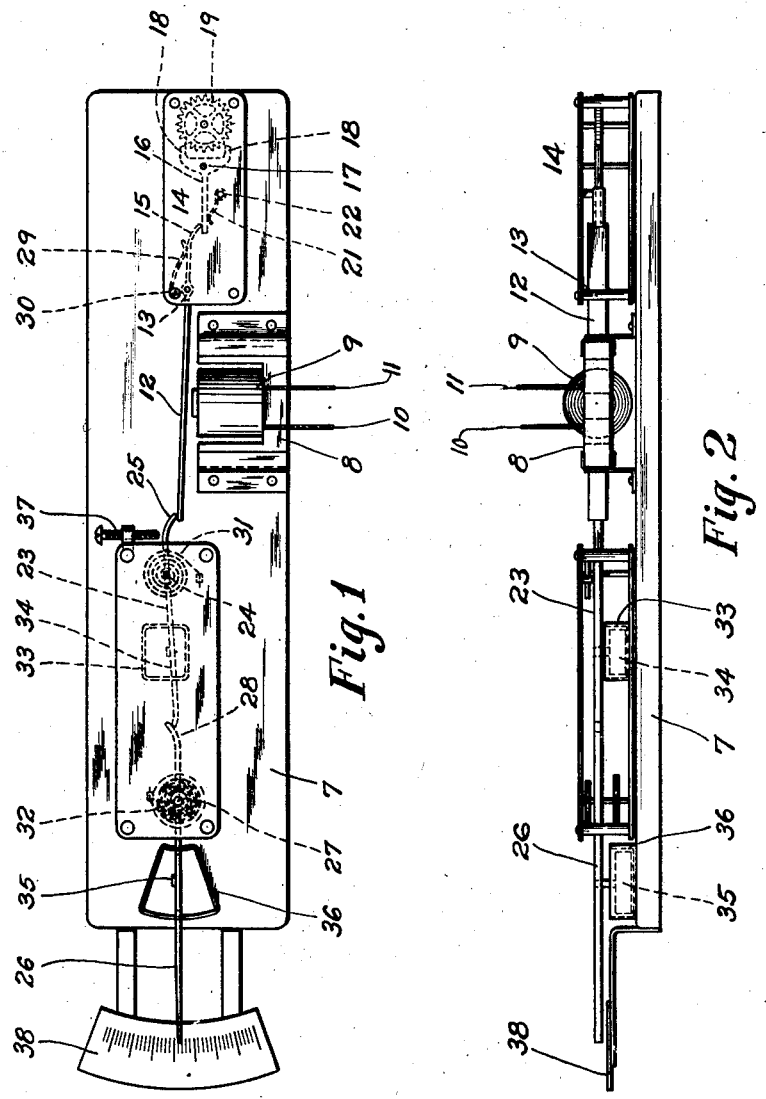
INVENTORS
Richard C. Thompson +
BY Fullerton D. Webster
Synnestvedt & Lechner
ATTORNEYS

Patented Sept. 12, 1933

1,926,660

UNITED STATES PATENT OFFICE

1,926,660

APPARATUS FOR MEASURING ELECTRICAL IMPULSE FREQUENCY

Richard Cowles Thompson, Woodmont, Conn., and Fullerton D. Webster, Mountain Lakes, N. J., assignors to American Transformer Company, Newark, N. J., a corporation of New Jersey Application April 1, 1931. Serial No. 526,876

29 Claims. (Cl. 175—368)

This invention relates to apparatus or instruments for measuring the frequency of electrical impulses and is especially adapted to the measurement of impulses of relatively low frequencies.

One of the primary objects of the present invention is the provision of an instrument of the character above referred to which is not only simple and rugged in construction but also accurate in measurement, and not subject to certain difficulties which have been encountered heretofore, particularly in the measurement of the relatively low frequencies.

Additionally, the present invention has in view the provision of an instrument which is capable of measuring the frequency of alternating current, the frequency of interruptions in a direct current or the frequency of interruptions in an alternating current.

How the foregoing objects and advantages are obtained, together with others which will occur to those skilled in the art, will be more apparent from a consideration of the following description taken with the accompanying drawings, in which—

Figure 1 is a top plan view of one form of apparatus embodying various improvements of the present invention;

Figure 2 is a side elevational view of the apparatus of Figure 1;

Figure 3:
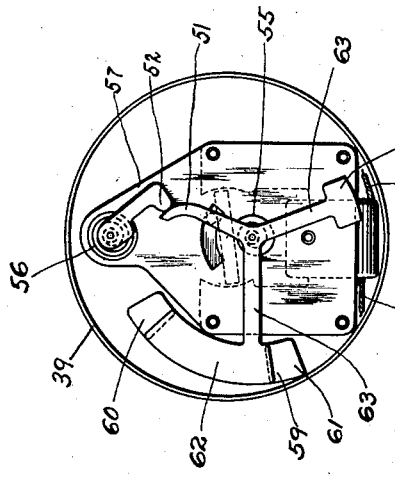
Figure 3 is a somewhat diagrammatic plan view of another form of instrument embodying various features of the present invention, certain parts of the apparatus being omitted for the sake of clarity.

Referring now particularly to Figures 1 and 2 in which one form of apparatus is illustrated, we have therein illustrated a structure including a supporting plate or base 7 of any character suitable for mounting the various parts or elements now to be described.

The apparatus includes an electromagnet or an electromagnetic device having a core, in this form, of E shape as indicated by the reference numeral 8. On the central leg of this core a suitable coil 9 is wound, the leads from the coil being indicated at 10 and 11. At this point it should be noted that the current or impulses of current whose frequency is to be measured is fed or passed through the coil 9.

The electromagnetic device further includes an armature or vibrating member 12 which is pivoted to a fixed part as indicated at 13, so that the element 12 may be free to move toward and away from the core 8 in synchronism with the impulses or alternations of the current being measured. The outward movement of the element 12 is provided for by means of a return spring 29 which is fixed as at 30.

If desired, an impulse counting mechanism such as indicated in general by the reference numeral 14 may be associated with the pivoted armature 12, one end of such armature being extended as indicated at 15 beyond the pivot point 13 to engage an oscillatable pawl-member 16 which as indicated in Figure 1 is pivoted at 17. The member 16, of course, is provided with suitable oppositely disposed prongs or teeth 18 which are adapted to engage the ratchet wheel 19 and effect rotation thereof in the well known manner of such devices. The counting mechanism itself is not illustrated herein but, of course, is suitably connected with the shaft 20 of the wheel 19. In order to maintain the operating end or arm of the member 16 adjacent to the extension 15 of the element 12, a spring device 21 fixed at 22 is arranged to maintain the member 16 in contact with the extension 15, the weights of the parts and the strength of the two springs 29 and 21 being so proportioned that the counting mechanism will not interfere with proper action of the armature 12.

The mechanism for giving a constant or continuous reading of the frequency being measured includes an arm or needle 23 which is pivoted as at 24 and provided with one end 25 extended to engage the element 12. At its other end the needle or member 23 is adapted to contact with a similar needle 26 which is pivoted on a shaft 27, the needle 26 being extended as indicated at 28 to engage the end of needle 23 remote from the point of engagement with the element 12.

A hair spring 31 is associated with the pivot shaft 24 of the needle 23 in such manner as to yieldingly urge the extension 25 toward the armature 12. In like manner a hair spring 32 is connected with the pivot shaft 27 of the needle 26 in order to resiliently urge its extension 28 toward the needle 23. Additionally, each of the needles 23 and 26 is provided with means for damping the movements thereof. In the case of the needle 23 a suitable receptacle or vessel 33 is arranged below the needle and adapted to contain some suitable damping liquid such as oil. Needle 23 carries a baffle element 34 which is adapted to move, with the needle, flat-wise in the oil or other liquid bath (see Fig. 2). Needle 26 carries a similar baffle or damping element 35 which is arranged for movement in liquid contained in a suitable vessel 36.

Any convenient type of stop means including, in this instance, an adjustable bolt 37, is arranged to limit movement of the extension 25 of needle 23 in one direction.

Preferably, the needle 26 is mounted in association with a graduated scale 38 which, of course, is suitably calibrated over the range of frequencies to the measurement of which any particular instrument is adapted.

The operation of this form of the apparatus or instrument is as follows, it being noted, at this point, that the range of frequencies to which instruments of this character are particularly adapted is below approximately 50 impulses per second. For purposes of illustration, it will be assumed that the instrument is being employed in the measurement of an interrupted direct current, the rate of interruptions falling within the above-noted range.

With such a current fed to the coil 9, the armature 12 will, of course, be drawn inwardly against the force of spring 29 once for each impulse of the interrupted current. The vibration or movement of the element 12 thus produced actuates or moves the needle 23 against the force of the spring 31 associated therewith. However, the force of spring 31 and also the reaction of the damping device associated with this needle are so arranged as to provide for movement of the extension 25 of this needle toward the armature 12 at a rate considerably lower than that of the frequencies being measured and, of course, lower than the rate of movement of the armature 12. This relatively slow movement of the needle 23 prevents completion of the return stroke thereof before the armature 12 again moves outwardly under the influence of spring 29 to engage the extension 25, so that the needle 23 takes or occupies a relatively stable or constant position as compared to the armature 12, vibrating substantially only between the position of maximum reading and the position indicating the frequency impressed on the coil.

The movements of needle 23, however, are not sufficiently small to obtain the best type of scale reading therefrom, although, under certain circumstances a reading may be taken from this needle. In order to obtain a practically vibrationless and constant reading of the frequency being measured, in the preferred form of apparatus, we utilize the movements of needle 23 to actuate an additional needle 26. The needle 26, furthermore, is provided with a spring 27 and a damping device 35—36 of such characteristics as to provide movement thereof at a rate even lower than that of needle 23, and with the spring and damping devices properly arranged as to their resilient and damping reactions, a practically constant reading of the frequency may be obtained on the scale 38.

In measuring an interrupted alternating current, for example, an alternating current of a frequency above, say 50 or 60 cycles per second, interrupted at a frequency within the range above noted, the instrument will read the interruption frequency only and the operation will not be disturbed in any way by the alternating character of the current. Thus the instrument is adapted to the measurement of the frequency of interruptions in any interrupted alternating current where the frequency of the alternating current itself does not fall within the range of interruption frequency which the particular instrument is adapted to measure.

Where it is desired to measure the alternations of an uninterrupted current of relatively low frequency, the alternations, of course, produce movements of the armature 12 in a manner similar to that described above in connection with the measurement of an interrupted direct current.

Before proceeding with a discussion of the instrument illustrated in Figures 3 to 6 inclusive, attention is called to the fact that in the arrangement of Figures 1 and 2 the relative positions of the elements 12, 23 and 26 may be reversed or inverted in such manner as to cause, for example, a movement of needle 23 under the influence of movement of the armature 12 toward instead of away from the core 8. Under such circumstances, of course, suitable changes in the direction of spring reaction (in the case of springs 31 and 32) would be made.

In Figures 3 to 6 inclusive, we have illustrated a somewhat modified and more compact instrument embodying various principles and features set forth above in connection with the form of Figures 1 and 2. According to this arrangement the parts may all be mounted within a suitable cylindrical casing 39.

A core 40 of a modified form is here employed, the same being provided with a coil 41 on one leg thereof, the coil having suitable leads 42 and 43. In this instance, a gap is provided in the core 40 and a suitable pivotally mounted armature 44 is arranged to swing or oscillate in the core gap under the influence of the electrical impulses being measured. A coil spring 45 is associated with the pivot shaft 46 of the armature 44 in order to provide for the return stroke. The oscillatable armature 44, furthermore, carries a tappet-member 47 positioned to strike, during vibrations on movements thereof, a pin or cooperating element 48 which is carried by a triple-armed needle or element 49 (see Figs. 5 and 6, particularly).

The part 49, it might be noted, occupies the same position in the general layout of this structure as the needle 23 of the modification of Figures 1 and 2. This part, furthermore, is pivoted on a shaft or pin 50 which is located centrally of the three substantially radially disposed arms.

The arm 51 of the oscillatable member 49 is preferably curved at its outer end and disposed in such manner as to strike the abutment 52 which is associated with the element 53, it being noted that this element occupies the same position in the general arrangement as the needle 26 of the structure illustrated in Figures 1 and 2.

The element or needle 53 in this case is mounted for pivotal movement on and with the shaft or pin 54.

As in the form of Figures 1 and 2, the needle or oscillatable member 49 is yieldingly urged in a direction to cause the pin 48 to move toward the tappet 47 by means of a coil or hair spring 55 associated with the pivot pin 50. In like manner the needle 53 is resiliently urged to cause its abutment 52 to contact with the arm 51 of element 49 by means of hair spring 56 operatively associated with pin 54. At this point it might be noted that suitable supporting or mounting plates 57 and 58 are preferably arranged within the casing 39 in order to carry the various pivotally mounted parts.

Additionally, as in Figures 1 and 2, the two needle elements 49 and 53 are provided with means for damping their movements. In the case of the part 49 we prefer to employ a magnetic damping device. In this particular instance, this device includes a fixed magnetized element 59 (see Figs. 3 and 4) having opposite poles 60 and 61 arranged adjacent the ends of the arcuate member 62 of electrical conducting material. This member 62 is mounted on or carried by the spoke or arm 63 of the oscillatable needle 49 and produces a damping action by the setting up of eddy currents therein in a manner well known in the art, but which need not be discussed in detail herein. The third radially extending arm 63 of this device may be employed to carry a small weight 64 which, if desired, may be relied on to supplement or to replace the action of spring 55 which serves to effect the return stroke after the tappet 47 has struck the pin 48.

Figure 5:
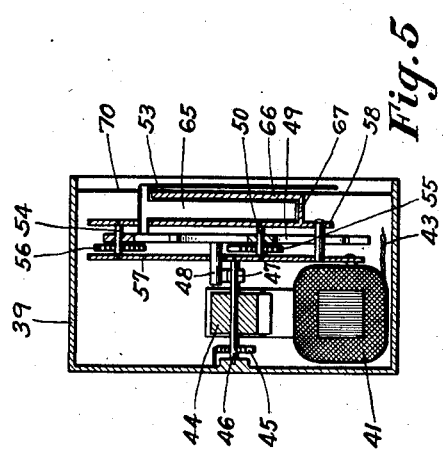
Figure 5 is a transverse sectional view through the apparatus of Figures 3 and 4.

The needle 53 in this form carries a baffle element 65 which is disposed to move within a closely fitting chamber formed between the mounting plate 58 and additional enclosing parts 66 and 67 (see Fig. 5). In this way, what might be termed an air-baffle damping means is provided for needle 53.

Figure 6:
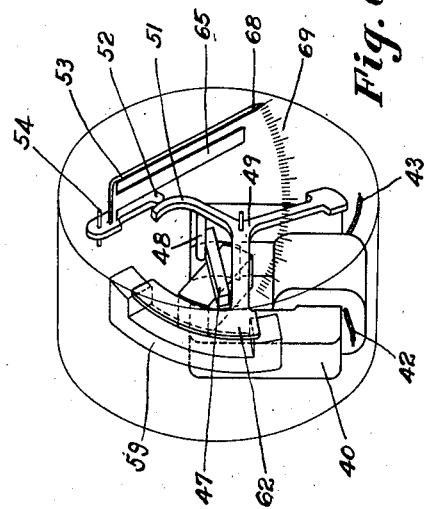
Figure 6 is a somewhat diagrammatic phantom view of various parts of the instrument of Figures 3 to 5 inclusive.
Figure 4:
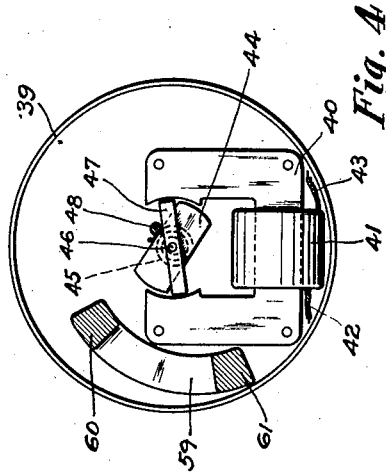
Figure 4 is a view similar in certain respects to Figure 3 but with certain parts shown in Figure 3 omitted in order to disclose others lying thereunder.

The needle 53, of course, carries a pointer 68 which is arranged to move across a suitable scale 69 disposed on the front face of the end plate 70 of the casing 39 (see Figs. 5 and 6).

The operation of this instrument is, in all essential respects, similar to that described above in connection with Figures 1 and 2. It should be noted, however, that in this instance no liquid damping devices are employed, so that vibrations or alterations in position of the instrument will not affect the damping action. Additionally, this form of the instrument, particularly in view of the type of damping devices employed, may be constructed of desirably small and light parts and at the same time maintain accurate reading of the frequencies being measured.

It will be apparent, of course, that if desired a suitable impulse or alternation counting mechanism may be associated with the instrument of Figures 3 to 6 inclusive.

According to the foregoing, we have provided a measuring or metering apparatus which is adapted to give indications of electrical impulse frequencies including that of an interrupted alternating current. The apparatus, therefore, is adapted to a wide variety of uses without changes or adjustments of its construction. At the same time it should be observed that, in view of the mechanical nature of the actuating mechanism of the meter (in contra-distinction to the magnetic types heretofore employed), the apparatus of the present invention affords accurate frequency indications even where it is positioned within the sphere of other magnetically operated or magnetizable structures or machines.

Finally, the fact that the meter of the present invention is responsive directly to electrical impulses or alterations, the voltage of the current or currents being measured do not impair or affect the frequency reading.

We claim:—

1. An electrical impulse frequency measuring mechanism including an electromagnetic device adapted to receive the impulses, an armature associated with said device and movable under the influence of impulses and indicating means associated with said armature including an oscillatable member actuated thereby and means for damping movements of said member, said member being oscillatable at a frequency below that of the movements imparted to said armature under the influence of impulses received by the device.

2. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member, the oscillatable member being so yieldingly urged as to move in the first mentioned direction at a rate lower than that of movements of the first mentioned member.

3. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member, together with means for damping movements of the oscillatable member.

4. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member, the oscillatable member being so yieldingly urged as to move in the first mentioned direction at a rate lower than that of movements of the first mentioned member, together with means for damping movements of the oscillatable member.

5. An electrical impulse frequency measuring device including a member movable under the influence of impulses at a frequency proportional to the rate thereof, an oscillatable member yieldingly urged in one direction and actuable in the other drection by movements of the first member, and frequency indicating means associated with the oscillatable member including a third member yieldingly urged in one direction and actuable in the other direction by movements of said oscillatable member.

6. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, together with means for damping movements of the third member.

7. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, together with means for damping movements of said oscillatable and third members.

8. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, together with means for damping movements of the oscillatable member.

9. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, the force with which said oscillatable and third members are yieldingly urged being such as to cause movement thereof at a rate lower than that of movement of the first mentioned member.

10. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, the force with which said oscillatable member is yieldingly urged being such as to cause movement thereof at a rate lower than that of movement of the first mentioned member.

11. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, the force with which said third member is yieldingly urged being such as to cause movement thereof at a rate lower than that of movement of the first mentioned member.

12. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, the force with which said oscillatable and third members are yieldingly urged being such as to cause movement thereof at a rate lower than that of movement of the first mentioned member, and the force with which said third member is urged being such as to cause movement thereof at a rate lower than that of the yieldingly urged movements of the oscillatable member.

13. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, together with magnetic means for damping movements of at least one of the last two mentioned members.

14. An electrical impulse frequency measuring device including a member movable under the influence of impulses at a frequency proportional to the rate thereto, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, together with magnetic means for damping movements of at least one of the last two mentioned members including relatively movable electrically conducting elements one of which is movable with one of said last mentioned members.

15. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, together with magnetic means for damping movements of said oscillatable member.

16. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, together with air-baffle means for damping movements of at least one of the last two mentioned members.

17. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, together with air-baffle means for damping movements of at least one of the last two mentioned members including an air chamber and a baffle movable, with one of said last mentioned members, flatwise in said chamber.

18. An electrical impulse frequency measuring device including a member movable under the influence of impulses at a frequency proportional to the rate thereof, an oscillatable member yieldingly urged in one direction and actuable in the other direction by movements of the first member, and frequency indicating means associated with the oscillatable member including a third member yieldingly urged in one direction and actuable in the other direction by movements of said oscillatable member, together with air-baffle means for damping movements of said third member.

19. In a device for measuring electrical impulse frequency, the combination of a part movable in synchronism with impulses, a pivoted member movable in one direction by movements of said part, means for yieldingly urging said member in the other direction, and frequency indicating means associated with said member, the normal rate of movement of said member in the said other direction being lower than that of movement of said part.

20. In a device for measuring electrical impulse frequency, the combination of a part movable in synchronism with impulses, a pivoted member movable in one direction by movements of said part, means for yieldingly urging said member in the other direction, and indicating means associated with said member, the normal rate of movement of said member in the said other direction being lower than that of movement of said part, said frequency indicating means including another pivoted member actuable by the first and arranged for movement at a rate lower than the normal rate of the first mentioned member.

21. An electrical impulse frequency measuring device including a member movable under the influence of impulses at a frequency proportional to the rate thereof, an oscillatable member mounted and arranged for oscillation at a frequency below that of the frequency range of impulses which the device is adapted to measure, said oscillatable member being actuable, in part, by the first member, and frequency indicating means associated with the oscillatable member.

22. An electrical impulse frequency measuring device including a member movable under the influence of impulses at a frequency proportional to the rate thereof, an oscillatable member mounted and arranged for oscillation at a frequency below that of the frequency range of impulses which the device is adapted to measure, said oscillatable member being actuable, in part, by the first member, and frequency indicating means associated with the oscillatable member, said indicating means including a third member mounted and arranged for oscillation at a frequency below that of the second member and being actuable, in part, by the said second member.

23. An electrical impulse frequency measuring device including a member movable under the influence of impulses at a frequency proportional to the rate thereof, an oscillatable member mounted and arranged for oscillation at a frequency below that of the frequency range of impulses which the device is adapted to measure, said oscillatable member being actuable, in part, by the first member, and frequency indicating means associated with the oscillatable member, together with means for damping movements of the last mentioned member.

24. An electrical impulse frequency measuring device including a member movable under the influence of impulses at a frequency proportional to the rate thereof, an oscillatable member mounted and arranged for oscillation at a frequency below that of the frequency range of impulses which the device is adapted to measure, said oscillatable member being actuable, in part, by the first member, and frequency indicating means associated with the oscillatable member, said indicating means including a third member mounted and arranged for oscillation at a frequency below that of the second member and being actuable, in part, by the said second member, together with means for damping movements of said third member.

25. An electrical impulse frequency measuring device including a member movable under the influence of impulses at a frequency proportional to the rate thereof, an oscillatable member mounted and arranged for oscillation at a frequency below that of the frequency range of impulses which the device is adapted to measure, said oscillatable member being actuable, in part, by the first member, and frequency indicating means associated with the oscillatable member, said indicating means including a third member mounted and arranged for oscillation at a frequency below that of the second member and being actuable, in part, by the said second member, together with means for damping movements of the second and third members.

26. An electrical impulse frequency measuring device including a member movable under the influence of impulses at a frequency proportional to the rate thereof, an oscillatable member mounted and arranged for oscillation at a frequency below that of the frequency range of impulses which the device is adapted to measure, said oscillatable member being actuable, in part, by the first member, and frequency indicating means associated with the oscillatable member, together with fluid damping means for movements of the last mentioned member including a baffle element associated with the member and movable in the fluid.

27. An electrical impulse frequency measuring device including a member movable under the influence of impulses at a frequency proportional to the rate thereof, an oscillatable member mounted and arranged for oscillation at a frequency below that of the frequency range of impulses which the device is adapted to measure, said oscillatable member being actuable, in part, by the first member, and frequency indicating means associated with the oscillatable member, said indicating means including a third member mounted and arranged for oscillation at a frequency below that of the second member and being actuable, in part, by the said second member, together with means for damping movements of said third member including an air chamber and a baffle movable, with the third member, flatwise in said air chamber.

28. An electrical impulse frequency measuring device including a member movable under the influence of impulses at a frequency proportional to the rate thereof, an oscillatable member mounted and arranged for oscillation at a frequency below that of the frequency range of impulses which the device is adapted to measure, said oscillatable member being actuable, in part, by the first member, and frequency indicating means associated with the oscillatable member, together with means for damping movements of the last mentioned member including relatively movable electrically conducting elements one of which is movable with the last mentioned member.

29. An electrical impulse frequency measuring device including a member movable under the influence of impulses at a frequency proportional to the rate thereof, an oscillatable member mounted and arranged for oscillation at a frequency below that of the frequency range of impulses which the device is adapted to measure, said oscillatable member being actuable, in part, by the first member, and frequency indicating means associated with the oscillatable member, said indicating means including a third member mounted and arranged for oscillation at a frequency below that of the second member and being actuable, in part, by the said second member, together with magnetic means for damping movements of said second mentioned member and air-baffle means for damping movements of the third member.

RICHARD COWLES THOMPSON.
FULLERTON D. WEBSTER.